Apr. 3, 1923. 1,450,589
G. GRAFF ET AL
COMBINED HEATING AND COOLING DEVICE
Filed Jan. 31, 1921  2 sheets-sheet 1
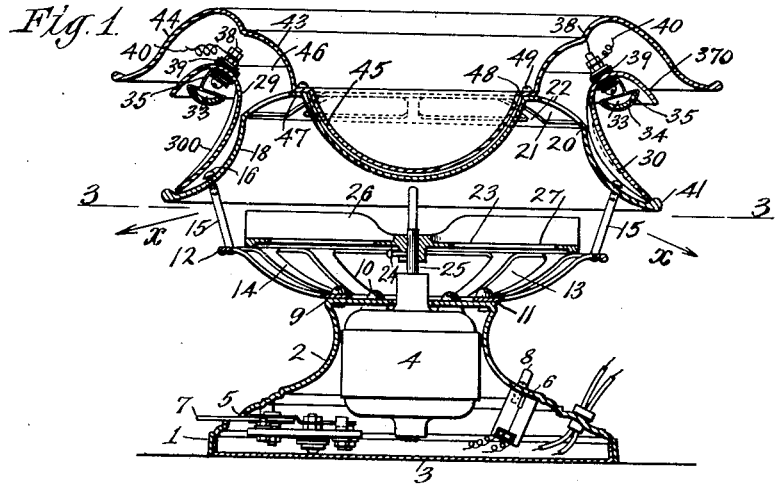
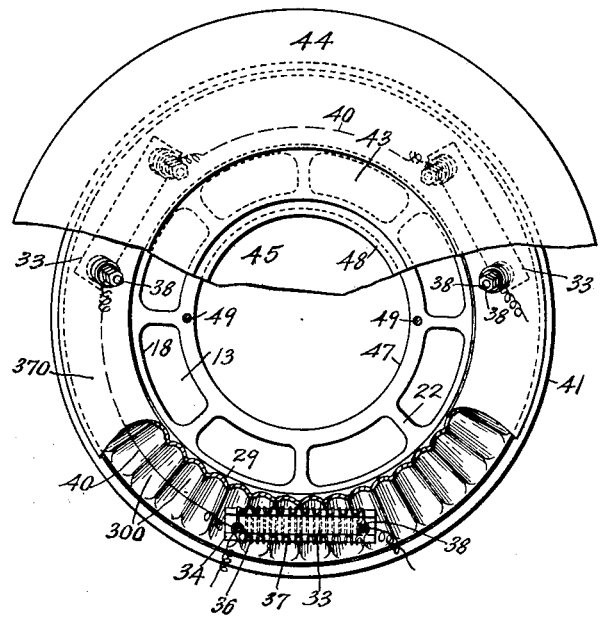

Apr. 3, 1923.   1,450,589
G. GRAFF ET AL
COMBINED HEATING AND COOLING DEVICE
Filed Jan. 31, 1921   2 sheets-sheet 2
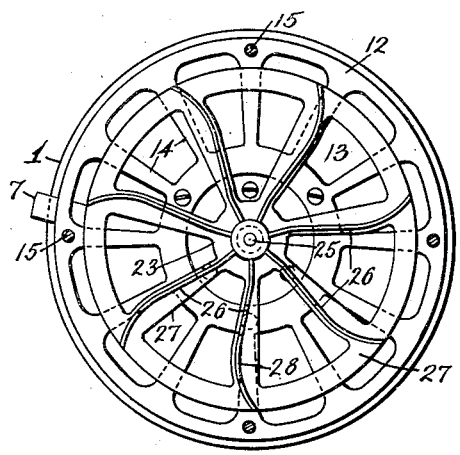
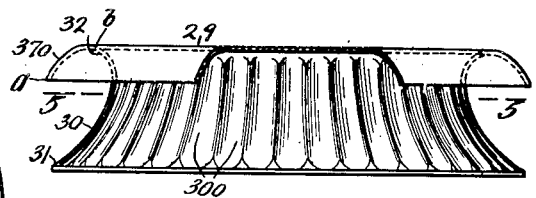
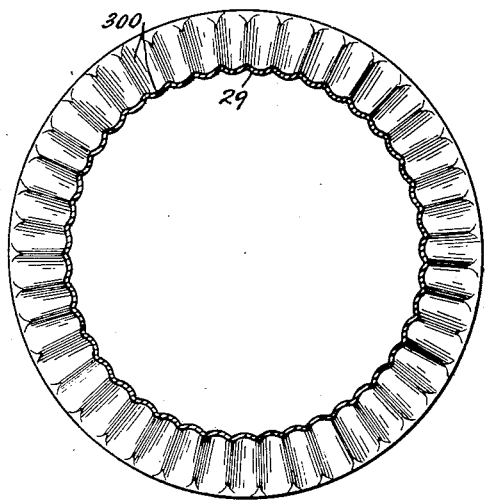
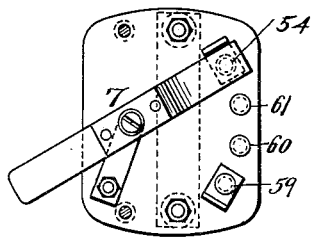
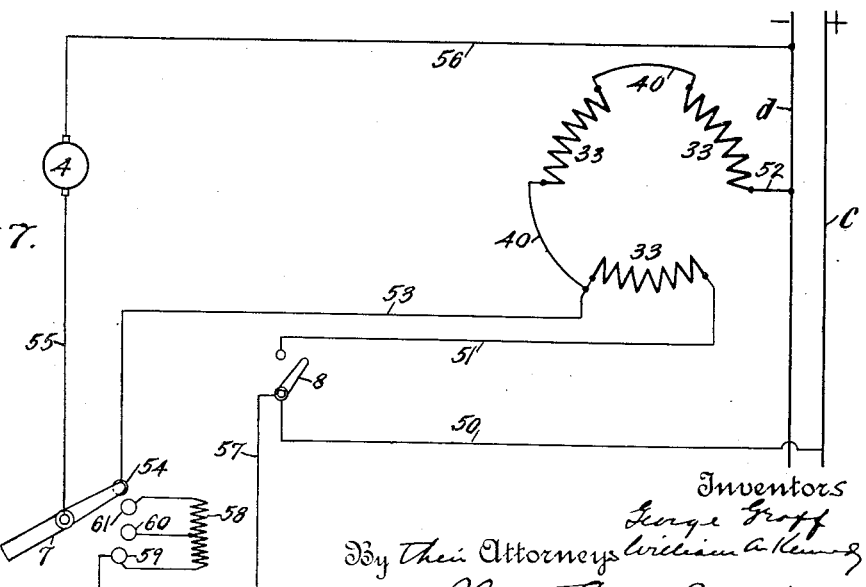
Inventors
George Graff
William A. Kennedy
By Their Attorneys
Phillips, Forwyn, Rice, Kennedy Patented Apr. 3, 1923.

1,450,589

UNITED STATES PATENT OFFICE.

GEORGE GRAFF, OF NEW YORK, N. Y., AND WILLIAM A. KENNEDY, OF LEONIA, NEW JERSEY, ASSIGNORS TO GRAFF, WASHBURNE & DUNN, A CORPORATION OF NEW YORK.

COMBINED HEATING AND COOLING DEVICE.

Application filed January 31, 1921. Serial No. 441,148.

*To all whom it may concern:*

Be it known that we, GEORGE GRAFF and WILLIAM A. KENNEDY, citizens of the United States, residing at the cities of New York and Leonia, counties of Bronx and Bergen, and States of New York and New Jersey, respectively, have invented certain new and useful Improvements in Combined Heating and Cooling Devices, fully described and represented in the following specification and the accompanying drawings, forming a part of the same.

This invention relates to certain improvements in combined heating and cooling devices.

It is the especial object of the invention to produce a combined portable heating and cooling device which may be used alone, or as an auxiliary to the permanent heating or air circulating arrangements of a room, the heating and cooling elements of the device being operative either independently of each other or together so the device may be used as a cooler if desired, and whether used alone as a heater, or as an auxiliary to the permanent room heating arrangement, or as a cooler, to combine the parts so as to produce a very efficient circulation of air, and an even regular distribution of heat, thus increasing the efficiency of the heating and cooling devices, and effecting a control of the room temperature which may be widely varied.

It is a further object of the invention to produce such a portable heating and cooling device in which a fan and heating element are combined with means for delivering the air and heat outwardly from substantially all sides of the device to produce a good circulation of the air and prevent the heat from rising directly up from the device until after it has been delivered outwardly therefrom.

A further object of the invention is to provide a combined fan and heating element in which the efficiency of the heating element is not impaired by the air currents produced by the fan.

A further object of the invention is to produce a device in which the parts are compactly arranged, which may be economically constructed, and in which the fan and the heating element may be substantially concealed so as to produce an attractive article, and one which may be readily moved from place to place, as may be desired.

A further object of the invention is to produce such a device which may be used to hold water, the parts being so arranged that no substantial amount of heat, when the device is used as a heater, is transmitted to the water holder, so that heating or rapid evaporation of the water is prevented.

The device may be variously used either hanging from some suitable support, or arranged to stand on a table, desk or other article of furniture, or the like. However used the device will preferably be provided with means whereby the motor, switches, wire connections to the coils, etc. will be concealed. In the drawings the device has been shown as portable and constructed to stand on a table, desk, or the like, and will be so described.

With these and other objects not specifically referred to in view, the invention consists in certain novel parts, arrangements and combinations, which will be described in detail in connection with the accompanying drawings and then pointed out in the claims annexed hereto.

In these drawings which illustrate a preferred form of the invention:

Figure 1 is a vertical section of the improved device.

Figure 2 is a top plan view of Fig. 1 partly in section and partly broken away.

Figure 3 is a plan view on the line 3—3 of Fig. 1 illustrating the fan and adjacent parts.

Figure 4 is a side view partly in section of the preferred form of heat reflector employed.

Figure 5 is a sectional plan view of the same, the section being taken on line 5—5 of Fig. 4.

Figure 6 is a detail of the switch for controlling the fan motor; and

Figure 7 is a diagrammatic view of the circuits for the motor and heating element.

Referring now to these drawings, the improved device includes a support in the form of a base 1, which is preferably flat, so as to form a firm support for the heater so that it can be readily placed on a table or stand or other article of furniture in a room.

This base 1 is, in the best constructions circular, and smaller in diameter above than at the bottom, as shown at 2 so as to provide a convenient means for grasping the heater to move it from place to place, and is as shown hollow to conceal the various elements placed therein, hereinafter referred to. The lower end of the base may be closed either by an integral web or by a removable flanged bottom plate 3 secured thereto, this removable plate being provided so that the interior of the base may be readily accessible to install or repair mechanisms which are contained therein, as hereinafter referred to.

Located within the base 1 is a motor 4, this motor being concealed by the base. The base is formed with apertures 5, 6 through which operate a controlling switch 7 which regulates the speed of the motor and a controlling switch 8 which controls the heating coils through circuits hereinafter referred to, the switches and the circuit wires being contained within the base 1 so as to be concealed.

The base 1 is or may be formed with a top 9 from the under side of which the motor may be suspended in any suitable manner, as by means of screws 10, the motor being thus concealed in the base.

Secured to this top is a dish shaped frame 11 provided with a peripheral supporting flange 12, the lower part of this frame being provided with openings 13, partitions 14 being left between the openings. The frame preferably curves upwardly and outwardly from the top 9 so as to present an attractive appearance, the openings between the partitions permitting a free passage of air upwardly, as hereinafter referred to.

The flange 12 of the frame 11 has secured thereto at suitable points on its outer edges uprights 15, on which is secured by screws 16 a supporting frame 18, having side walls 20 downwardly and outwardly curved and provided with apertures 21 and partitions therebetween 22, to permit free passage of air. This supporting frame 18 is preferably spaced by the uprights 15 from the lower frame 11 to leave a free passage through which air may be expelled sidewise, as indicated by the arrow $x$ in Fig. 1, and the two members arranged as shown act to render the fan, hereinafter referred to, quite inconspicuous.

Mounted above the frame 11 is a fan 23, this fan being driven by motor 4 and secured by a set screw 24 to a shaft 25, which may be the armature shaft of the motor.

The function of this fan is to produce a strong air circulation through the device and to deliver the air outwardly sidewise from the device and from around all sides thereof. A further function of this fan is to draw air past the heating element so that the air will be heated and to deliver or distribute the air so heated outwardly sidewise of the device and around all sides thereof. Various types of fans may be provided for effecting this, but to obtain a very efficient air control the fan will be so constructed and arranged as to cause air to be drawn both from the bottom and from the top of the device, one of these air currents being exposed to the influence of the heating element, and both these air currents uniting and being expelled or delivered outwardly and preferable slightly downwardly from all sides of the device, suitable deflectors hereinafter referred to being provided for co-operating with the fan to produce this result.

In the particular construction illustrated the fan is shown as formed of thin blades of metal marked 26, seven such blades being shown, though it will be understood that any desired number of blades may be employed. These blades are mounted edgewise on a spider 27 secured to the armature shaft of the motor. These blades are, as shown, curved slightly toward their outer ends, as indicated at 28. This form of blade causes the air to be drawn both upwardly and downwardly, and to be delivered sidewise of the blade, the blades being proportioned and arranged so that this sidewise delivery is, in the particular construction illustrated, about centrally of the device and slightly downward.

Co-operating with the fan is an improved heating element and a deflecting means by which air may be brought under the influence of the heating element and delivered sidewise. The deflecting means are such that the air will be drawn past the heating element and will prevent the air and the heat from the heating element from rising directly up from the heater until the air and the heat have been delivered sidewise from around the device. Various forms of heating element may be provided. The heating element will, however, be combined with with the fan so that the fan may be operated to produce a good circulation of air without impairing the heating efficiency of the heating element and such element will preferably be used.

As illustrated, this element includes a hollow plate preferably circular of metal marked generally 29, and in the best constructions this metal will be highly polished to afford a good reflecting surface and one which at the same time will indicate by reflection that the plate is heated, and copper has been found to be a suitable material for this plate, as this metal can be given a high polish and does not readily tarnish.

This metal plate is imperforate and is in effect a heat reflector and is formed so that the heat rays will be reflected outwardly therefrom and substantially evenly peripherally thereof. The reflecting surface of this plate is concave in vertical section and the concave may be varied. The concave will, however, preferably be parabolic so that the heat rays will be delivered sidewise from the reflecting surface. The plate is, therefore, formed as shown with a parabolic surface marked 30, one end of the parabola being at 31 and the other end at a point as 32.

In the best constructions the parabolic surface of this plate in order to get an increased efficiency in the reflecting action is fluted, being broken up into a number of slightly concave surfaces preferably parabolic in cross section, indicated at 300, which increases the distribution of the heat rays outwardly in the desired direction. Co-operating with the plate is an electrical resistance in the form of a coil or coils 33. The specific construction of these coils may be varied, but whatever the form of coil this coil will be located at a focus of the parabola when the reflecting surface is parabolic in shape. This focus in the particular construction illustrated is the point 32, and the heat rays from the coil will be reflected from the plate outwardly in lines parallel with the axis of the parabola. In order that the device may be used with ordinary electric circuits, such as the usual household light circuit, there is a limit to the amount of wire which can be used in the coil as, if too much wire is used blow outs in the circuits occur. It is further desirable for economy in construction that the amount of wire used be as small as possible and yet obtain the necessary resistance to produce a good heat and without unduly increasing current and consumption. A form of coil has been devised to meet these conditions which will preferably be employed. As shown there are provided three of these coils which are identical in construction and which are located at equal distances from each other around the plate, and a description of one of these coils will suffice for all. As shown the coil comprises a third round of porcelain or other suitable insulated material 34 to which the wires 35 are attached, the wires being bent to form loops 36 by which they may be supported on grooved edges 37 (see Fig. 2) of the third round 34. This construction requires the use of a minimum amount of wire for producing good heating effects.

With this construction, furthermore, the major portion of the wire is supported so that the heat rays therefrom project sidewise and downwardly against the parabolic surface of the plate and only the radiation from the loops or hooks 36 extends upwardly.

In the best constructions means will be provided for utilizing the heat rays which come from the loops or hooks 36 of the coil, before referred to, and to effect this the plate is formed with a reflecting surface which will catch and reflect these rays so that they will strike against the parabolic surface and be directed downwardly. Various constructions for effecting this may be employed. As shown the plate is formed with what may be termed a hood in the form of an outwardly and downwardly curved flange 370, this flange being formed integral with the plate. The inner surface of this hood or flange will preferably be polished and may, as shown, have a portion thereof, as from the point $a$ to the point $b$ in the form of a parabola, so as to suitably reflect and direct the heat rays.

The coils 33, before referred to, may be supported in any suitable manner, and a convenient way is by supporting them underneath the hood or flange 370 by means of screws 38, the coils being supported at each end by the wire and insulated from the flange by suitable insulation 39. The coils are connected together in series by conducting wires 40 which lead to the switch 8, before referred to.

The plate 29 and the coil supported thereby may be mounted or supported in the device in any suitable manner. In the particular construction illustrated the supporting frame 18, before referred to, has at its outer periphery a bead 41. The lower edge of the plate 29 is set on this frame and is held in place by bearing against the inner wall of the bead, a construction which permits easy and ready assembling.

It will be seen from the construction so far described, that all the heat efficiency of the coils is utilized, and this efficiency is not impaired in any way by the action of the fan, as the air currents produced by the fan are kept away from the coils by the plate and its hood or flange, and a deflecting means hereinafter described, and the coils consequently can deliver their heat up to their capacity, and furthermore this distribution is even and regular around the periphery of the plate.

In the devices embodying the invention, means are provided for deflecting or guiding an air current past the heating device to be heated thereby and delivered sidewise outwardly around the device on all sides thereof. Means are also provided whereby the upper part of the reflector plate and the coil are concealed or rendered inconspicuous so as to add to the attractiveness of the device, and in the best constructions means are also provided for holding water so as to hold flowers or other plants which add to the attractiveness of the device as a whole.

While various means may be employed for effecting these results, in the preferred form of the device there will be employed a single means whereby all these various results may be attained. In the construction shown there is provided a deflector plate 43. This deflector plate preferably in the form of a dish, is provided with a downwardly extending periphery or skirt 44 and a depressed central portion 45, this depressed central portion extending downwardly toward the fan through the central aperture in the plate 29.

The skirt 44 is extended over the hood or flange 370 of the deflector plate 29, before referred to, and extends outwardly beyond the flange and downwardly so as to conceal or render inconspicuous this hood or flange and the coil carried thereunder. This deflector 43 is imperforate and prevents the upward passage of heat from the coil and there is formed a passage 46 between the deflector plate 29 and the deflector 43 through which air is drawn by the fan past the rear side of the reflector plate and is heated thereby. The depressed portion 45 of the deflector acts to deflect the air currents and assist in guiding them so that they will be thrown outwardly sidewise as before described.

The passage 46 also acts as an insulating passage and keeps the deflector 43 from becoming heated by the radiation from the coil. The depressed portion of the plate, therefore, may be utilized to hold water in which may be arranged flowers or other plants to add to the attractiveness of the device, if desired.

The deflector 43 may be secured in place in any suitable manner. In the particular construction illustrated, the frame 18, before referred to, is provided with a flange 47 on which may be seated a flange 48 formed on the deflector 43 and if desired the parts may be secured together by screws 49.

With the construction described and with the parts arranged vertically, one above the other, as shown, a compact convenient structure is produced, which may be easily moved about and which is attractive in appearance.

The construction permits the use of the fan without lessening the efficiency of the heating unit and the heat and air are deflected from the device outwardly from all sides thereof and the air is easily controlled within any desired limits, and the air and the heat are delivered where wanted.

The circuits for the coils and the fan may be arranged in any convenient way, but as before stated in the best constructions they will be such that the fan motor and the heating element may be operated either independently or together so that if desired the device may be used as a cooler alone without the heating element. If the heating element is used the fan will preferably also be used as described, and furthermore the circuits will be such that the speed of the motor may be increased or decreased as desired so as to control the air delivered from the device.

In Figure 6 is illustrated a detail of the switch mechanism for the fan motor, and in Figure 7 a diagrammatic layout of the circuits for effecting this. As there shown, assuming the switch 8 to be closed, current passes through the leading-in wire $c$ over the wires 50 and 51 to the coils indicated by the resistance 33. This resistance is connected through connection 52 with the leading-out wire $d$ and the resistance is also connected through wire 53, contact 54 and switch 7 with the motor 4 through wire 55 and the motor through wire 56 is connected to the leading-out wire $d$. When the parts are in this position and the switch 8 is closed current is admitted to the coils and to the motor which, when the switch 7 is on contact 54 runs the fan motor and the coil together at the highest speed the motor will run. In the circuit with the switch 8 through conductor 57 is a resistance 58 controlled by three contacts 59, 60 and 61. If it is desired to run the fan motor at a lower speed the switch 7 may be moved from contact 54 on to one of the contacts 59, 60 or 61, depending on the speed desired whereupon current will pass through conductor 57 through the resistance 58 to the motor. If it be desired to run the motor without the heating element the switch 8 may be left open and the switch 7 moved on one of the contacts 59, 60 or 61 depending on the motor speed required, and the circuit then is through leading-in wire $c$ wires 50 and 57, resistance 58 and wire 55 to the motor, and out through wire 56 and the leading-out wire $d$.

While the invention has been shown and described in its preferred form and arrangement, it will be understood that various heating elements may be used and various forms of reflectors for reflecting the heat rays and various forms of deflectors for directing the air out sidewise of the device, and that the invention is not to be limited to the specific features of the construction described, but that variations in the arrangement and in the construction of the various parts may be made in the scope of the invention as defined by the appended claims.

What is claimed:

1. In a device of the character described, the combination of a base, an electric motor mounted thereon, a fan driven from the motor, a heating element, and means for directing air and heat outwardly peripherally from the device and preventing a substantial amount of heat and air from rising directly upward from the device.

2. In a device of the character described, the combination of a base, an electric motor mounted thereon, a fan driven from the motor, a heating element, means located above the fan for directing heat and air outwardly peripherally from the device, and preventing a substantial amount of heat and air from rising directly upward from the device, and means for operating the motor and coil independently or together.

3. In a device of the character described, the combination of a base, an electric motor mounted thereon, a fan driven from the motor, a heating coil, means for reflecting heat from the coil outwardly about the periphery of the device, and an imperforate deflector above the coil and acting to prevent a substantial amount of heat and air from rising directly upward from the device.

4. In a device of the character described, the combination of a base, an electric motor mounted thereon, a fan driven from the motor, a heating coil arranged above the fan, means for reflecting heat from the coil outwardly sidewise about the periphery of the device, and an imperforate deflector having a downwardly flaring outer portion or skirt for making the coil inconspicuous and spaced from the coil to form an air passage therebetween.

5. In an electric heater, the combination of a hollow base, an electric motor mounted therein and concealed thereby, a fan driven from the motor, supporting frames arranged on each side of the fan and spaced apart, a heating coil arranged above the fan, means for reflecting heat from the coil outwardly sidewise about the periphery of the device, and a deflector above the coil having a downwardly flaring outer periphery and spaced therefrom to form a passage therebetween.

6. In an electric heater, the combination of a hollow base, an electric motor mounted therein and concealed thereby, a fan driven from the motor, a pair of dish shaped frames arranged on each side of the fan and spaced apart, said frames being provided with air openings, a heating coil arranged above the fan, and a deflector above the coil having a downwardly flaring outer periphery and a depressed central portion spaced from the coil.

7. In a device of the character described, the combination of a base, an electric motor mounted thereon, a fan driven from the motor, a heating coil above the fan, and a deflector above the coil having a depressed central portion and an outwardly flaring skirt.

8. In a device of the character described, the combination of a base, an electric motor mounted thereon, a fan driven from the motor, a heating coil above the fan, and a deflector above the coil having a downwardly flaring periphery and a depressed central portion, the deflector being spaced from the coil so as to leave a passage between the coil and the deflector body.

9. In a device of the character described, the combination of a base, an electric motor mounted thereon, a fan driven from the motor, a heating coil above the fan, an imperforate deflector above the coil having a downwardly extending outer portion spaced from the coil to form an air passage therebetween, and means for operating the motor and coil independently or together.

10. In a device of the character described, the combination of an electric motor, a fan arranged above the motor and driven therefrom, a heating coil, means for reflecting heat from the coil outwardly sidewise about the periphery of the device, and an imperforate deflector above the coil for deflecting air downwardly to expose it to heat from the coil.

11. In a device of the character described, the combination of a support, an electric motor mounted thereon, a fan driven from the motor, a heating element above the fan, and a deflector above said element and having a downwardly flaring outer periphery and a central depressed portion spaced from the coil to leave an air space therebetween.

12. In a device of the character described, the combination of an electric motor, a fan driven from the motor, a heating element, and an imperforate deflector above the heating element for directing air downwardly to expose it to the heating element and preventing the rise of heated air.

13. In a device of the character described, the combination of an electric motor, a fan driven from the motor, a heating element, an imperforate deflector above the heating element for directing air downwardly to expose it to the heating element, and means for operating the motor and heating element independently or together.

14. In a device of the character described, the combination of a motor, a fan driven thereby, a heating coil, a reflecting surface for reflecting heat from the coil outwardly around the sides of the device, and a deflecting means arranged so that air may be drawn past the coil to heat it without dimming the coil.

15. The combination of a motor, a fan driven thereby, a heating coil above the fan, a reflecting surface behind and over the coil for directing heat outwardly sidewise therefrom, and a deflector over the reflecting surface and spaced therefrom to form an air passage.

16. The combination of a motor, a fan driven thereby, a heating coil above the fan, a reflector having a parabolic surface behind the coil for directing the heat outwardly sidewise therefrom, a hood or flange over the coil, and a deflector over the hood and spaced therefrom to form an air passage.

17. The combination of a motor, a fan driven thereby, heating coils above the fan, a hollow plate having a parabolic reflecting surface behind the coils for directing heat outwardly sidewise therefrom, a hood or flange over the coils, and a circular deflector over the plate and spaced therefrom to form an air passage.

18. The combination of a motor, a fan driven thereby, a heating coil above the fan, a reflector surface behind and over the coil for directing heat outwardly sidewise therefrom, and a deflector over the reflecting surface having a downwardly flaring periphery and depressed central portion spaced from the reflector surface to form an air passage.

19. The combination of a motor, a fan driven thereby, heating coils above the fan, a hollow circular plate having a parabolic reflecting surface behind the coils for directing heat outwardly sidewise therefrom, a hood or flange over the coils, and a deflector over the hood having a downwardly flaring outer periphery and central depressed portion extending into the plate and spaced from the hood to form an air passage.

20. The combination of a motor, a fan driven thereby, a hollow reflecting plate having a hood or flange, coils disposed over the plate under the hood, and a deflector over the hood and spaced therefrom to form an air passage.

21. The combination of a motor, a fan driven thereby, a hollow plate having a parabolic reflecting surface, and a hood or flange, heating coils disposed about the plate beneath the flange, and a deflector over the hood and spaced therefrom to form an air passage.

22. The combination of a motor, a fan driven thereby, a heating coil above the fan, a hollow plate having a fluted reflecting surface behind the coil for directing heat outwardly sidewise therefrom, and a deflector over the plate and spaced therefrom to form an air passage.

23. The combination of a motor, a fan driven thereby, a hollow plate having a fluted reflecting surface, a plurality of heating coils arranged around the surface, a hood over the coils, and a deflector over the hood and spaced therefrom to form an air passage.

24. The combination of a motor, a fan driven thereby, a hollow plate having a fluted parabolic reflecting surface, a plurality of coils disposed around the plate, a hood over the coils, and a deflector over the hood and spaced therefrom to form an air passage.

25. The combination of a base, a motor mounted thereon, a fan driven thereby, a hollow plate located above the fan and having an outer polished reflecting surface, heating coils disposed about the outer surface of the plate, a hood over the coils, and a deflector over the hood and spaced therefrom to form an air passage through which air may be drawn by the fan downwardly past the inside of the plate.

26. The combination of a base, a motor mounted thereon, a fan driven thereby, a hollow plate located above the fan and having an outer polished heat reflecting surface, heating coils disposed about the outer surface of the plate, a hood over the coils, and a deflector over the hood having a downwardly flaring periphery and depressed central portion extending into the plate so as to form an air passage through which air may be drawn by the fan downwardly past the inner side of the plate and delivered outwardly sidewise from beneath the plate.

27. A heating element comprising a hollow plate having an outer reflecting parabolic surface, heating coils disposed around the outer surface of the plate, and a hood over the coils.

28. A heating element comprising a hollow plate having a fluted parabolic reflecting surface, heating coils disposed around the surface, and a hood over the coils.

29. A heating element comprising a fluted parabolic reflecting surface, and a plurality of heating coils disposed around the surface.

30. A heating element comprising a fluted parabolic heat reflecting surface, a plurality of separate coils disposed about the surface, and a hood over the coils.

31. A heating element comprising a hollow plate having a parabolic reflecting surface, heating coils disposed about the surface, and a hood over the coils having a parabolic reflecting surface.

32. A heating element comprising a hollow plate having a fluted parabolic reflecting surface, heating coils disposed about the surface, and a hood over the coils having a parabolic reflecting surface.

33. A heating element comprising a hollow plate having an outer convex reflecting surface, heating coils disposed around the surface, and a hood over the coils.

34. A heating element comprising a hollow plate having an outer convex reflecting surface, heating coils disposed around the surface, and a hood over the coils having a convex reflecting surface.

35. In a device of the character described, the combination of an electric motor, a fan driven from the motor and located above it, a heating element located above the fan, a reflecting surface for reflecting heat outwardly sidewise from the heating element around the sides of the device, and a deflector above the heating element for directing air past the heating element to expose it to the heat therefrom.

36. A heating element comprising a heat reflecting surface, and a heating coil, said heating coil including a support with the wires so arranged thereon that the major portion of the heat rays project from one side of the support.

37. A heating element comprising a heat reflecting surface, a heating coil, and a hood about the coil said coil including a support with the wires so arranged thereon that the major portion of the heat rays project from one side of the support.

38. A heating element comprising a heat reflecting surface, and a heating coil, said heating coil including a support in the form of a half round with the wires supported on the edges of the half round and extending over the curved surface thereof so that the major portion of the heat rays project from the curved portion of the half round.

39. The combination of a motor, a fan driven thereby, a heating coil about the fan, a reflecting surface behind and over the coil for directing heat outwardly sidewise therefrom, and a deflector over the reflecting surface.

40. The combination of a motor, a fan driven thereby, a heating coil above the fan, a reflector having a parabolic surface behind the coil for directing the heat outwardly sidewise therefrom, and a deflector over the reflecting surface.

In testimony whereof, we have hereunto set our hands.

GEORGE GRAFF.
WILLIAM A. KENNEDY.